United States Patent

Arai et al.

[11] Patent Number: 5,906,778
[45] Date of Patent: May 25, 1999

[54] CONTROL METHOD FOR INJECTION MOLDING MACHINE

[75] Inventors: Tsuyoshi Arai; Takayu Yamazaki, both of Nagano, Japan

[73] Assignee: Nissei Plastic Industrial Co., Ltd, Nagano-Ken, Japan

[21] Appl. No.: 08/947,882

[22] Filed: Oct. 9, 1997

[30] Foreign Application Priority Data

Oct. 9, 1996 [JP] Japan ................................ 8-268605

[51] Int. Cl.$^6$ ................................................ B29C 45/77
[52] U.S. Cl. .................... 264/40.1; 264/40.7; 264/328.1; 425/145; 425/150; 364/475.05
[58] Field of Search ................................ 264/40.1, 40.5, 264/40.7, 328.1; 425/145, 150, 589, 590; 364/475.02, 475.05

[56] References Cited

U.S. PATENT DOCUMENTS

| | | | |
|---|---|---|---|
| 4,592,713 | 6/1986 | Gutjahr | 264/40.5 |
| 4,592,714 | 6/1986 | Gutjahr | 264/40.5 |
| 5,238,383 | 8/1993 | Bannai | 264/40.5 |
| 5,482,662 | 1/1996 | Nakamura et al. | 264/40.1 |
| 5,493,503 | 2/1996 | Richards et al. | 264/40.7 |
| 5,513,971 | 5/1996 | Nakamura et al. | 264/40.7 |
| 5,514,311 | 5/1996 | Shimizu et al. | 264/40.5 |
| 5,533,884 | 7/1996 | Nakamura et al. | 264/40.5 |
| 5,554,326 | 9/1996 | Nakazawa et al. | 425/145 |
| 5,582,782 | 12/1996 | Kato et al. | 264/40.1 |
| 5,595,693 | 1/1997 | Fujita et al. | 425/145 |
| 5,688,535 | 11/1997 | Koda et al. | 264/40.7 |

FOREIGN PATENT DOCUMENTS 8-150642  6/1996  Japan.

*Primary Examiner*—Jill L. Heitbrink
*Attorney, Agent, or Firm*—Birch, Stewart, Kolasch & Birch, LLP

[57] ABSTRACT

A servo valve is connected to a hydraulic cylinder for driving a movable body for shifting. A control signal is applied from a controller to the servo motor for controlling speed of the movable body in an injection molding machine. Control is performed in such a manner that open-loop control of a speed is performed by applying a control signal on the basis of a speed command value to the servo motor in a shifting zone of the movable body including an acceleration region. Closed-loop control is performed by applying a control signal (derived on the basis of a deviation between a speed detection valve and speed command value), to the servo valve in a shifting zone of the movable body including a decelerating region. By such a control method, in which the shifting zone including the accelerating region and the shifting zone including the decelerating region are separated, stability of control, necessary response characteristics, and precision can be maintained in a shifting range.

6 Claims, 3 Drawing Sheets

CONTROL METHOD FOR INJECTION MOLDING MACHINE

BACKGROUND OF THE INVENTION

1. Field of the Invention

The present invention relates to a control method for an injection molding machine, in which a servo valve is connected to a hydraulic cylinder for shifting a movable body, such as a movable platform, screw or so forth, for controlling a speed of the movable body.

2. Description of the Related Art

In general, in a clamping device Ms provided in an injection molding machine M as shown in FIG. 3, a servo valve 4 is connected to hydraulic cylinders 3x and 3y which drive a movable platform 2m (movable body 2) for shifting, for performing closed loop control of the speed of the movable platform 2m by supplying a control signal Cs derived on the basis of a difference between a speed detection value Vd and a speed command value Vc, from a controller 5.

On the other hand, since response of servo control is lowered when the servo valve 4 is employed, a measure has been taken conventionally in such a manner that an accumulator is connected to a discharge line of a hydraulic pump for maintaining stability and providing high response of the servo control by charging a high fluid pressure in the accumulator, as disclosed in Japanese Unexamined Patent Publication (Kokai) No. Heisei 8(1996)-150642. When the accumulator is connected to the clamping device Ms shown in FIG. 3, it is typical to establish connection as illustrated by the phantom lines. In FIG. 3, a reference numeral 50 shown by phantom lines denotes an accumulator connected to a discharge line Ls of a hydraulic pump 6. Reference numeral 51 shown by phantom lines denotes a check valve connected between the hydraulic pump 6 and the accumulator 50 upon connection of the accumulator 50.

However, with such conventional control methods employing the servo valve, size and cost of the hydraulic circuit is increased due to the accumulator where an extra hydraulic pump is used for charging high fluid pressure to the accumulator. Also, since the accumulator has to be constantly charged with the high fluid pressure, power consumption becomes large, which in turn, increases problems with energy efficiency and economy.

SUMMARY OF THE INVENTION

Therefore, it is an object of the present invention to provide a control method for an injection molding machine which can maintain stability of control, necessary response characteristics and precision while reducing size and cost of a hydraulic circuit.

Another object of the present invention is to provide a control method for an injection molding machine which can reduce electric power consumption which in turn enhances energy saving and economy.

In order to accomplish the above-mentioned objects, a control method for an injection molding machine, according to one aspect of the present invention, includes a servo valve connected to a hydraulic cylinder for driving a movable body for shifting, and a control signal is applied from a controller to a servo valve for controlling speed of the movable body. The method comprises the steps of, in a shifting zone which includes an acceleration region of the movable body, performing open loop control of a speed by applying a control signal on the basis of a speed command value to the servo valve, in a shifting zone which includes a decelerating region of the movable body, performing closed loop control by applying a control signal derived on the basis of a deviation between a speed detection value and speed command value, to the servo valve.

With this method, in the shifting zone of the movable body which includes the accelerating region, the control signal based on the speed command value is applied to the servo valve to perform open loop control for adjusting the speed of the clamping device. Therefore, in this shifting zone, unstable behavior will not occur. Accordingly, it is unnecessary to provide high pressure fluid, i.e. from an accumulator to be used together with a hydraulic pump, for assuring high response during acceleration (upon starting up). In the shifting zone of the movable body which includes the decelerating region, since high response and high precision control is required, the control signal is based on the deviation between the speed detection value and the speed command value to perform closed loop control of the speed. In this case, in the shifting zone which includes the deceleration region, deceleration control or stop control by restricting pressurized fluid flow rate is performed, which in turn substantially eliminates the need for high pressure fluid.

Thus, with the control method, in which a shifting zone includes the accelerating region and another shifting zone includes the decelerating zone, stability of control, necessary response characteristics, and precision can be maintained over an entire shifting range.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not limit the scope of the present invention.

At first, discussion will be given for a construction of a major part of a clamping device Ms shown in FIG. 3 which is employed in an injection molding machine that can implement the preferred embodiment of a control method according to the present invention.

Figure 3:
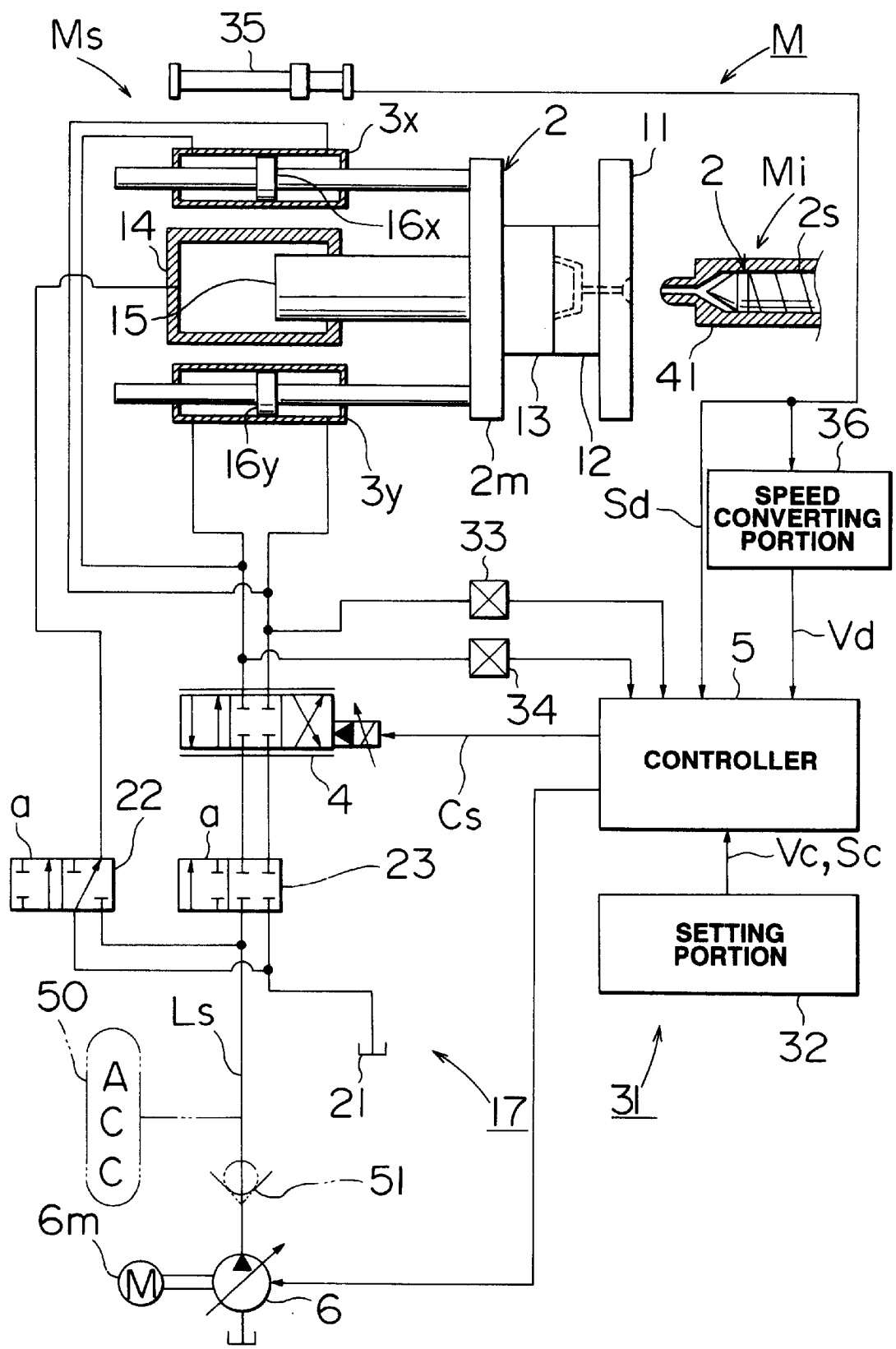
FIG. 3 is an illustration showing a general construction of the clamping device, for which the preferred embodiment of the control method according to the present invention is applicable.

In FIG. 3, reference numeral 11 denotes a stationary platform, on which a stationary die 12 is mounted, while 2m denotes a movable platform (movable body 2), on which a movable die 13 is mounted. The stationary die 12 and the movable die 13 form a mold for injection molding. The movable platform 2m is slidably supported by a tie bar (not shown) for movement toward and away from the stationary die 12. Reference numeral 14 denotes a high speed clamping cylinder, in which a rod type piston 15 is disposed. A tip end of the piston 15 is coupled with a back surface of the movable platform 2m. Reference numerals 3x and 3y are a pair of high speed type die opening and closing cylinders (hydraulic cylinders) arranged at both sides of the high pressure clamping cylinder 14, in which rod type pistons 16x and 16y are disposed therein.

Front rod portions of the pistons 16x and 16y are coupled with the rear end face of the movable platform 2m.

On the other hand, the high pressure clamping cylinder 14 and the high speed type opening and closing cylinders 3x and 3y are connected to a hydraulic circuit 17. The hydraulic circuit 17 in FIG. 3 illustrates only the portion associated with implementation of the preferred embodiment of a control method discussed later, while the other portion is neglected. The hydraulic circuit includes a servo valve 4, a variable piston pump (hydraulic pump) 6, a pump motor 6m, an oil tank 21, a switching valve 22 for the high pressure clamping cylinder and a switching valve 23 for high speed opening and closing cylinders. In FIG. 3, an accumulator 50 and a check valve 51 shown by the phantom line are merely for discussion of the prior art and not necessary for the preferred embodiment of the present invention. Accordingly, a discharge side of the variable piston pump 6 is directly connected to the switching valve 22 for the high pressure clamping cylinder and the switching valve 23 for high speed opening and closing cylinder.

Reference numeral 31 denotes a control circuit which includes a controller implementing a computer function for executing various processes and a control and sequence control function. The control circuit further includes a setting portion 32 for setting various position command values Sc including various speed command values Vc and control switching positions Xca and Xce. Pressure sensors 33 and 34 detect a pressure upon opening and closing of the die of the movable platform 2m, and a position sensor 35 detects a position of the movable platform 2m. The pressure sensors 33 and 34 are connected to an input side of the controller 5. The position sensor 35 is connected to the input side of the controller 5 directly and via a speed converting portion 36. By this dual connection to the position sensor, the controller 5 receives a position detection value Sd directly input from the position sensor 35 and a speed detection value Vd obtained via the speed converting portion 36. On the other hand, an output side of the controller 5 is connected to the servo valve 4 and the variable piston pump 6. A control signal Cs is applied to the servo valve 4 from the controller 5. Reference sign Mi denotes an injection device which includes a screw 2s (movable body 2) inserted within a injection barrel 41.

Figure 1:
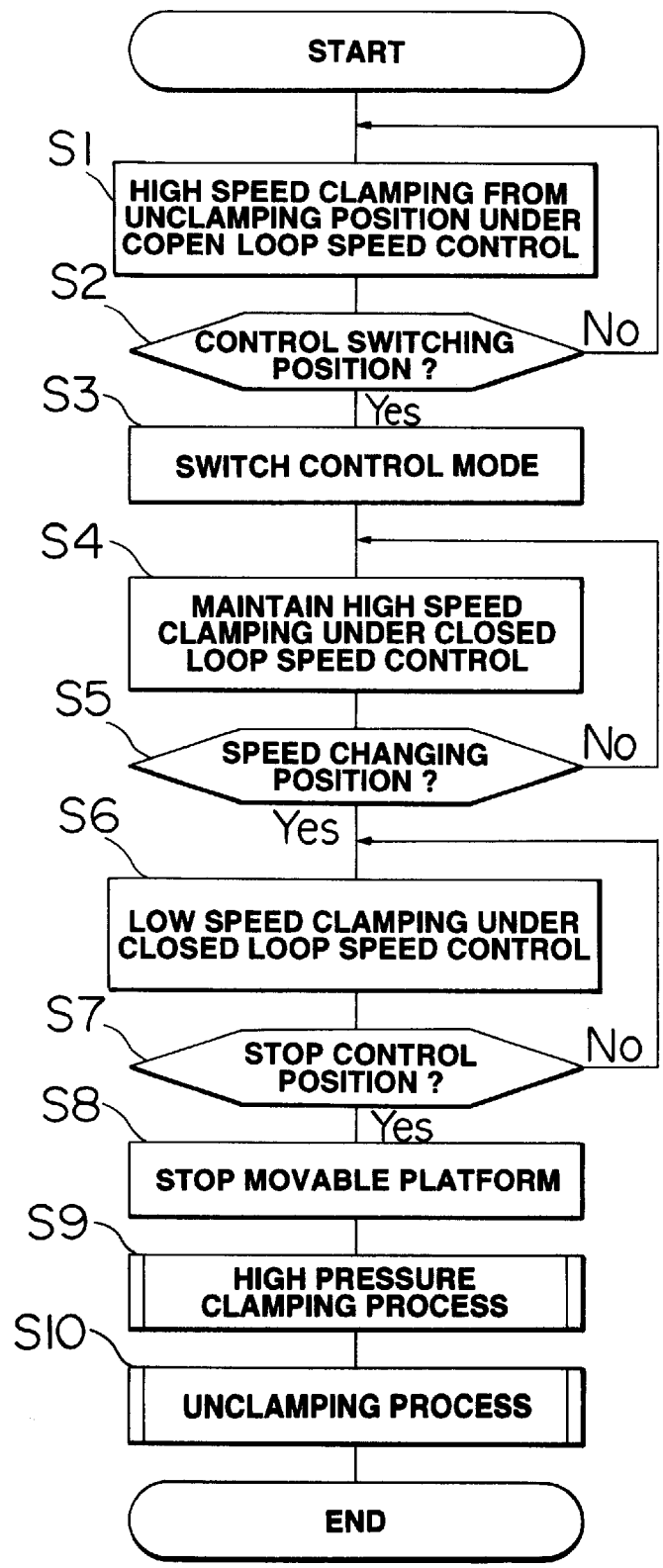
FIG. 1 is a flowchart showing a process in the case where a clamping device of an injection molding machine is controlled by the preferred embodiment of a control method according to the present invention.

Next, discussion will be given for the preferred embodiment of a control method applied to the clamping device Ms, with reference to the flowchart shown in FIG. 1 and further to FIGS. 2 and 3.

Figure 2:
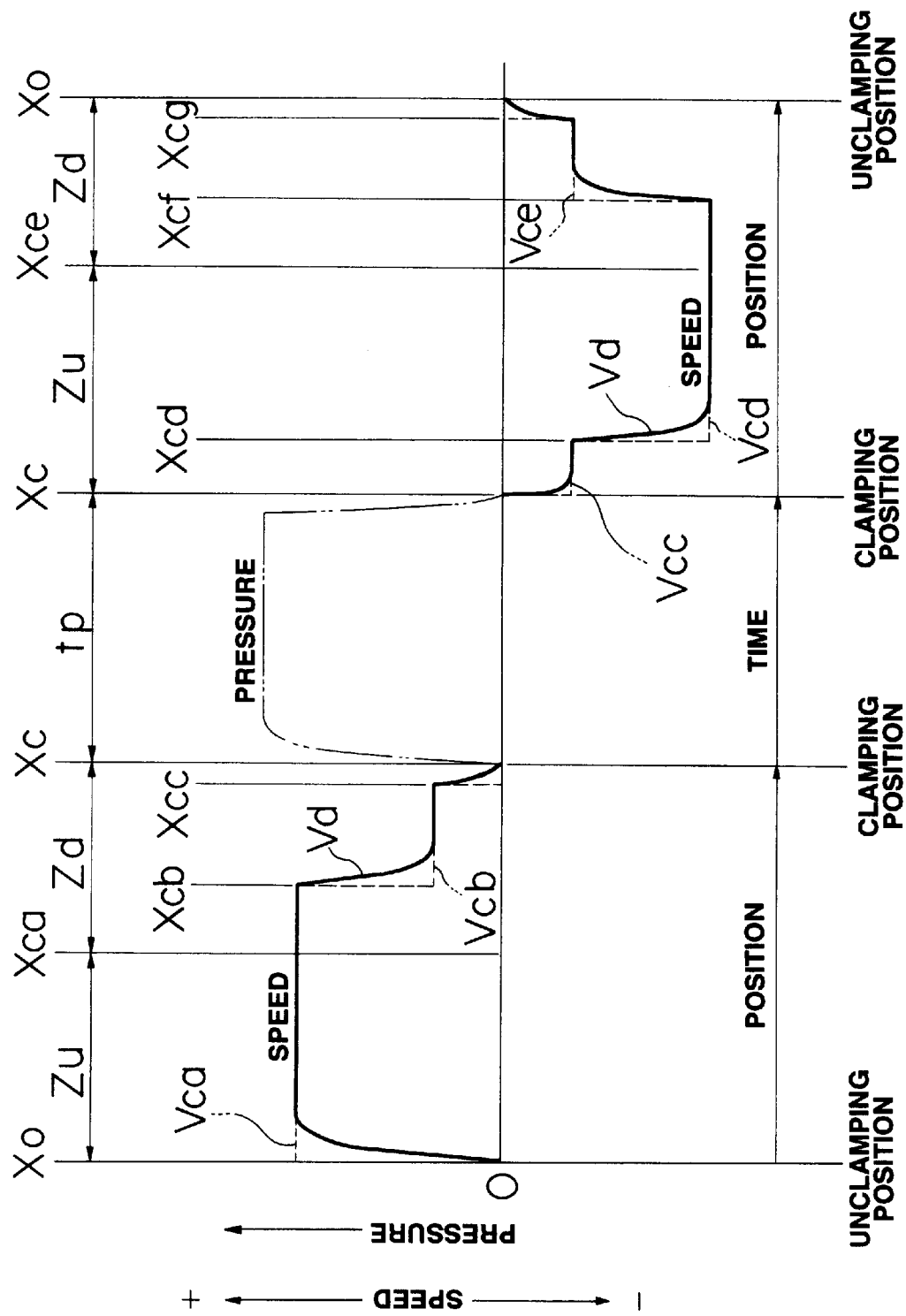
FIG. 2 is a chart showing variation of speed and pressure of a movable platform in the case where the clamping device is controlled by the preferred embodiment of the control method of the present invention.

The clamping device Ms is illustrated as placed at unclamping position Xo (see FIG. 2). At first, the high speed type opening and closing cylinders 3x and 3y are driven for a die closing process. The die closing process is performed by moving the die from the unclamping position Xo to a speed changing position Xcb at high speed and by moving the die from the speed changing position Xcb to a die closing position Xc at low speed. At an intermediate position in a constant speed region from the unclamping position Xo to the speed changing position Xcb, a control switching position Xca is set. Accordingly, the zone from the unclamping position Xo to the control switching position Xca becomes a shifting zone Zu which includes an acceleration region of the movable platform 2m. The zone from the control switching position Xca to the die closing position Xc becomes a shifting zone Zd which includes a deceleration region of the movable platform 2m. It should be noted that the switching valve 23 for high speed die opening and closing cylinder is switched to the left side position as shown by symbol a as shown in FIG. 3.

A practical die closing process will be performed in the following manner. At first, by applying the control signal Cs on the basis of the speed command value Vca (Vc) to the servo valve 4 from the controller 5, open loop control for the speed is performed (step S1). By this, high speed die closing is performed. In this case, owing to open loop control, unstable behavior, such as over shooting and so forth, upon initiation of operation is substantially prevented.

The controller 5 monitors the position detection value Sd of the movable platform 2m obtained from the position sensor 35 to detect when the movable platform 2m reaches the control switching position Xca set by the position command value Sc for switching the control mode (steps S2 and S3). Namely, the control signal Cs (derived on the basis of a deviation of the speed detection value Vd and the speed command value Vca) is applied to the servo valve 4 from the controller to perform closed loop control for the speed (step S4). Then, when the movable platform 2m is further shifted to reach the speed changing position Xcb, the speed command value Vca is modified to lower speed command value Vcb (Vc). By this, low speed die closing under closed loop control is performed (steps S5 and S6). When the movable platform 2m reaches a stop control position (slow down start position) Xcc, the control signal Cs based on the deviation of the position detection value Sd and the position command value Sc (Xc) is applied to the servo valve 4 to perform closed loop control for the stopping position. By this, the movable platform 2m is accurately position and stopped at the die closing position Xc (steps S7 and S8).

Next, the switching valve 22 for the high speed clamping cylinder is switched to supply a pressurized fluid to the high pressure clamping cylinder 14. By this supply of pressured fluid, a high pressure clamping process is initiated (step S9). During a period tp, the high pressure clamping process is performed. The high pressure clamping process includes a pressure control region and a control mode which is not relevant to the control method according to the present invention. Therefore, during this period the control method of the present invention is held inactive, while resin is injected from the injection device Mi into the mod cavity to fill therein. It should be noted that, after injection, the mold is held in place for a predetermined period for curing.

After completion of the high pressure clamping process, an unclamping process is performed (step S10). In this case, the switching valve 22 for the high speed clamping cylinder is switched into the left side position as represented by symbol a. The unclamping process is performed substantially similar to the clamping process. Accordingly, a shifting zone including an accelerating zone of the movable platform 2m is similarly shown by Zu, and a shifting zone including deceleration region is similarly shown by Zd. At first, the control signal Cs based on the speed command value Vcc (Vc) is applied from the controller 5 to the servo valve 4 to perform open loop control of the speed. By this, low speed unclamping is performed. On the other hand, the controller 5 monitors the position detection value Sd from the position sensor 35 for indicating the position of the movable platform 2m. Then the movable platform 2m reaches a first speed changing position Xcd, where the speed command value Vcc is modified into Vcd (Vc).

Then, the movable platform 2m is further moved backward to reach the control switching position Xce set by the position command value Sc. then, the control signal Cs is derived on the basis of deviation between the speed detection value Vd and the speed command value Vcd from the controller to the servo motor to perform closed loop control of the speed.

As movable platform 2m is further moved backward to reach the second speed changing position Xcf, the speed command valve Vcd is modified into the speed command value Vce (Vc) for lower speed. By this, low speed unclamping is performed under closed loop control. When the movable platform 2m reaches the stop control position Xcg, the control signal Cs derived on the basis of the deviation of the position detection value Sd and the position command value Sc (Xo) is sent from the controller 5 and applied to the servo valve 4 to precisely stop at the predetermined stop position under closed loop control. Thus, the movable platform 2m can be positioned accurately at a predetermined unclamping position.

As set forth above, the shown embodiment of a control method has been described where a goal of the clamping method during the clamping and unclamping operation is speed control of the moveable object in respective zones from the clamping position Xc and stop control position Xcc and Xcg and between the stop control position to stop position, and unclamping position Xo. Closed loop control for the controlled object is performed during meter-out control and positioning control of the object. In the high speed shifting zone which includes the accelerating zone, open loop control is performed.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which are within a scope encompassed and equivalents thereof with respect to the features set out in the appended claims.

For instance, while the shown embodiment has been discussed in terms of control of the movable platform 2m of the clamping apparatus Ms, a similar control method according to the present invention is equally applicable for injection speed and injection terminating positions of the screw 2s or so forth. It should be noted a control switching position Xca based on time should be encompassed within the range of equivalents of the claimed invention. Also, the shifting zone Zu including the accelerating region of the movable body 2 does not include the deceleration region. Also, the shifting zone Zd including the decelerating region does not include the acceleration region.

What is claimed is:

1. A control method for an injection molding process, the method comprising the steps of:
   (a) providing a hydraulic circuit including a servo valve and a hydraulic cylinder with a first end and a second end;
   (b) providing a moveable body within the hydraulic cylinder;
   (c) inputting a position value into a control circuit connected to the servo valve, the position value defining a location between the first end and second end of the hydraulic cylinder;
   (d) inputting a speed command value into the control circuit;
   (e) moving the moveable body in a direction away from the first end towards the second end of the hydraulic cylinder while detecting the position of the moveable body;
   (f) calculating speed of the moveable body with the control circuit based on position detection of the moveable body;
   (g) increasing and controlling speed of the moveable body with the control circuit in an open-loop control manner based on the speed command value; and
   (h) when the moveable body is detected at a position within the hydraulic cylinder which corresponds to the position value, controlling the speed of the moveable body with the control circuit in a closed-loop manner by comparing the speed command value with the calculated speed of the moveable body, whereby stability of control of the moveable body in addition to precision and response characteristics of the moveable body are substantially increased while size and energy consumption of the hydraulic circuit are substantially reduced.

2. The control method for an injection molding process as set forth in claim 1, wherein the position value is a first position value and the speed command value is a first speed command value, the method further comprising the steps of:
   inputting a second position value into the control circuit, the second position value defining a location between the first position value and the second end of the hydraulic cylinder;
   inputting a second speed command value into the control circuit; and
   when the moveable body is detected at a position within the hydraulic cylinder which corresponds to the second position value, controlling the speed of the moveable body with the control circuit in a closed loop manner by comparing the second speed command value with the calculated speed of the moveable body.

3. The control method for an injection molding process as set forth in claim 2, further comprising the steps of:
   inputting a third position value into the control circuit which defines a location corresponding to the second end of the hydraulic cylinder;
   inputting a fourth position value into the control circuit, the fourth position value defining a location between the second position value and the third position value; and
   when the moveable body is detected at a position within the hydraulic cylinder which corresponds to the fourth position value, controlling the movement of the moveable body with the control circuit in a closed loop manner by comparing third position value with the detected position of the moveable body.

4. The control method for an injection molding process as set forth in claim 1, further comprising the steps of:
   moving the moveable body away from the second end towards the first end of the hydraulic cylinder according to a substantially reverse manner of steps (a) through (h).

5. The control method for an injection molding process as set forth in claim 1, wherein said moveable body is a screw of an injection device.

6. The control method for an injection molding process as set forth in claim 1, wherein said moveable body is a piston having a platform.

* * * * *